US 9,986,822 B2

(12) United States Patent
Burgess et al.

(10) Patent No.: US 9,986,822 B2
(45) Date of Patent: Jun. 5, 2018

(54) METHOD AND APPARATUS FOR COOLING AN AIRLINE GALLEY CART USING A SKIN HEAT EXCHANGER

(71) Applicant: The Boeing Company, Chicago, IL (US)

(72) Inventors: Michael J. Burgess, Seattle, WA (US); James P. Schalla, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 64 days.

(21) Appl. No.: 14/267,142

(22) Filed: May 1, 2014

(65) Prior Publication Data
US 2015/0313356 A1    Nov. 5, 2015

(51) Int. Cl.
| A47B 31/02 | (2006.01) |
| B60H 1/32 | (2006.01) |
| B60H 1/00 | (2006.01) |
| B64D 13/08 | (2006.01) |
| F25D 17/04 | (2006.01) |
| B64D 13/06 | (2006.01) |

(52) U.S. Cl.
CPC ......... *A47B 31/02* (2013.01); *B60H 1/00014* (2013.01); *B60H 1/32* (2013.01); *B64D 13/08* (2013.01); *F25D 17/045* (2013.01); *A47B 2031/023* (2013.01); *B64D 2013/0629* (2013.01); *B64D 2013/0674* (2013.01)

(58) Field of Classification Search
CPC ............ B64D 2013/0629; B64D 11/04; F28D 2021/0021; A47B 2031/023; B60H 1/00014

USPC .................................................... 62/185, 356
See application file for complete search history.

(56) References Cited

U.S. PATENT DOCUMENTS

| 3,982,584 A | 9/1976 | Spanoudis |
| 4,361,014 A * | 11/1982 | Blain .................... A47J 39/006 62/237 |
| 5,369,960 A | 12/1994 | Mueller et al. |
| 5,423,498 A | 6/1995 | Fluegel |
| 5,513,500 A | 5/1996 | Fischer et al. |
| 6,880,351 B2 * | 4/2005 | Simadiris ............... B64D 11/04 62/185 |
| 7,024,874 B2 * | 4/2006 | Zywiak .................. B64D 11/04 62/199 |
| 7,093,458 B2 * | 8/2006 | Hu ........................ B64D 13/00 62/238.6 |
| 7,788,941 B2 * | 9/2010 | Campbell ............. F24F 5/0017 62/185 |
| 8,220,284 B2 * | 7/2012 | Tsubone ............. B60H 1/00492 165/10 |
| 2004/0159118 A1 | 8/2004 | Hu |

(Continued)

FOREIGN PATENT DOCUMENTS

| DE | 4105034 A1 | 8/1992 |
| WO | 1996025597 A1 | 8/1996 |

(Continued)

*Primary Examiner* — Frantz Jules
*Assistant Examiner* — Filip Zec
(74) *Attorney, Agent, or Firm* — Felix L. Fischer

(57) ABSTRACT

A system for cooling a thermally insulated galley cart in an aircraft incorporates a skin heat exchanger configured to transfer heat to an aircraft skin. A cooling system is in communication with the skin heat exchanger and is configured to be removably coupled with a thermally insulated galley cart.

15 Claims, 16 Drawing Sheets

(56) References Cited

U.S. PATENT DOCUMENTS

2005/0253019 A1    11/2005  Hoehne et al.
2011/0186263 A1     8/2011  Piesker
2012/0125023 A1*    5/2012  Kopko .................. F25B 25/005
                                                              62/113
2012/0291459 A1*   11/2012  Millar .................... B64D 11/04
                                                              62/79

FOREIGN PATENT DOCUMENTS

WO      2011019909 A1    2/2011
WO      2012158297 A2   11/2012
WO      2014003882 A1    1/2014

* cited by examiner

METHOD AND APPARATUS FOR COOLING AN AIRLINE GALLEY CART USING A SKIN HEAT EXCHANGER

REFERENCE TO RELATED APPLICATIONS

This application is copending with application Ser. No. 14/267,188 filed on May 1, 2014 entitled Optimally Configured Air-Flow Galley Cart having a common assignee with the present invention, the disclosure of which is incorporated herein by reference.

BACKGROUND INFORMATION

Field

Embodiments of the disclosure relate generally to galley cart systems for transportation vehicles and, more particularly, to a system for providing cooled working fluid to insulated galley carts and freezer galley inserts with an ambient air skin heat exchanger on an aircraft having high cruising altitude and a simplified interface between the galley and the carts and inserts.

Background

Galley carts employed for food service in transportation vehicles, such as aircraft and trains, often require cooling to maintain food and beverages at a temperature that is cooler than a cabin of the vehicle. At least some known carts include or connect to an active refrigeration system (a chiller) that provides cool air to an interior volume of the cart to cool the food/beverages. However, the chiller is powered by the vehicle systems, reducing the amount of power available to the vehicle for propulsion, thrust, etc. As such, the chiller is an inefficient draw on the power supply system of the vehicle. Further, such a chiller system adds weight and complexity to the vehicle and may produce undesirable noise. Accordingly, some galley carts are configured to contain water ice or dry ice that cools the food/beverages as it melts or sublimates. Either of these cooling approaches requires the regular replacement of the cooling media, such as the water ice or dry ice. An additional drawback with the use of dry ice is the carbon dioxide gas ($CO_2$) sublimate that is released. The Federal Aviation Administration has set forth requirements for the maximum $CO_2$ concentration in a cabin of the aircraft.

It is therefore desirable to provide improved and cost effective systems for providing cooling for galley carts and freezer galley inserts.

SUMMARY

Exemplary embodiments provide a system for cooling a thermally insulated galley cart in an aircraft. A skin heat exchanger is configured to transfer heat to an aircraft skin. A cooling system is in communication with the skin heat exchanger and is configured to be removably coupled with a thermally insulated galley cart.

The embodiments provide a method for maintaining temperature control of foodstuffs for use in an aircraft. The insulated galley cart is cooled with an internal heat sink during on ground or climb out operations. Aircraft altitude is monitored to determine when the aircraft reaches a critical altitude to provide external temperatures sufficient for cooling in a skin heat exchanger closed coolant loop. When critical altitude has been reached, a coolant pump is turned on. Blower locations in a semi closed air loop in communication with the closed coolant loop through a coolant to air heat exchanger are monitored to determine if an insulated galley cart is loaded into position at that location. If an ICC is loaded in or returned to the blower location, the blower at that position is turned on.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein employ thermally insulated galley carts (IGC) and a heat exchanger system communicating with the exterior skin of an aircraft. The IGC may employ an internal heat sink keep its contents cool during portions of a flight when the skin heat exchanger is not effective, such as on the ground or during takeoff. Cooling of the cart on the airplane in flight is achieved by a cooling system having at least one loop and, in particular, a two or three loop cooling system. In such a multi-loop cooling system the first loop contains a liquid coolant that is pumped through a skin heat exchanger to release heat, and then pumped through coolant/air heat exchangers. The coolant/air heat exchangers cool cabin air as a working fluid that flows through the IGCs. The first heat exchanger in the loop receives the coolest fluid, and depending on cooling requirements, may be used by a galley insert in the form of a freezer, or a galley cart dedicated to frozen food storage. The cold coolant continues from the first heat exchanger and enters a second heat exchanger in-line with, and downstream from, the first heat exchanger. Air from the second heat exchanger is then blown through an IGC.

During low altitude phases of the flight and while on the ground, the foodstuffs in the IGC or freezer galley insert may be chilled by an internal heat sink, such as dry ice or water ice The use of the internal heat sink allows for the benefits of active refrigeration with a system that is more inexpensive and lighter weight than conventional galley/cart cooling systems. Because the system described herein uses heat exchangers and does not require an active refrigeration heat pump, the major consumer of power in a chiller, the power requirements are reduced. In addition, maintenance issues associated with the use of a heat pump are also eliminated. The embodiments disclosed may be used in conjunction with cold air distribution configurations in the IGCs as described in copending application Ser. No. 14/267,188 entitled "Optimally Configured Air-Flow Galley Cart" for enhanced efficiency.

Figure 1:
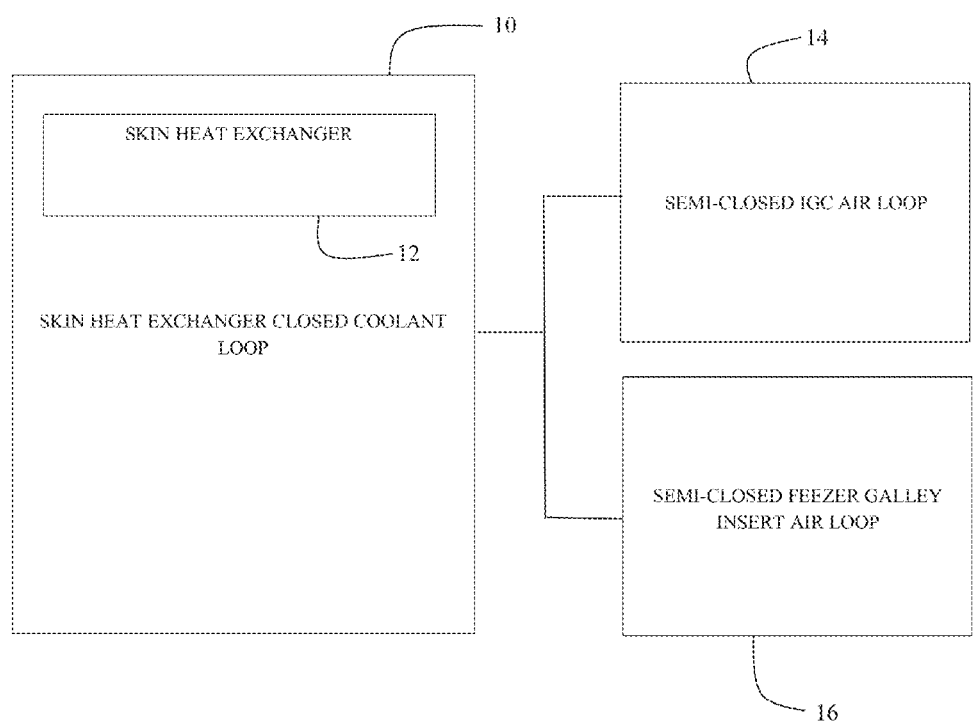
FIG. 1 is a block diagram of the elements of the skin heat exchanger closed coolant loop and insulated galley cart and freezer insert loops.

Referring to the drawings, FIG. 1 shows an exemplary system for cooling an IGC in an aircraft employing a skin heat exchanger configured to transfer heat to an aircraft skin and a cooling system in communication with the skin heat exchanger, wherein the cooling system is configured to be removably coupled with the IGC. A closed coolant loop 10 operates with a skin heat exchanger 12 to condition a working fluid coolant during flight at high altitudes where cold external temperatures outside the aircraft skin may be employed by the skin heat exchanger 12 as a cold sink. The closed coolant loop 10 provides coolant for conditioning of a semi-closed IGC air loop 14 and, in certain embodiments, a semi-closed freezer galley insert air loop 16.

Figure 2:
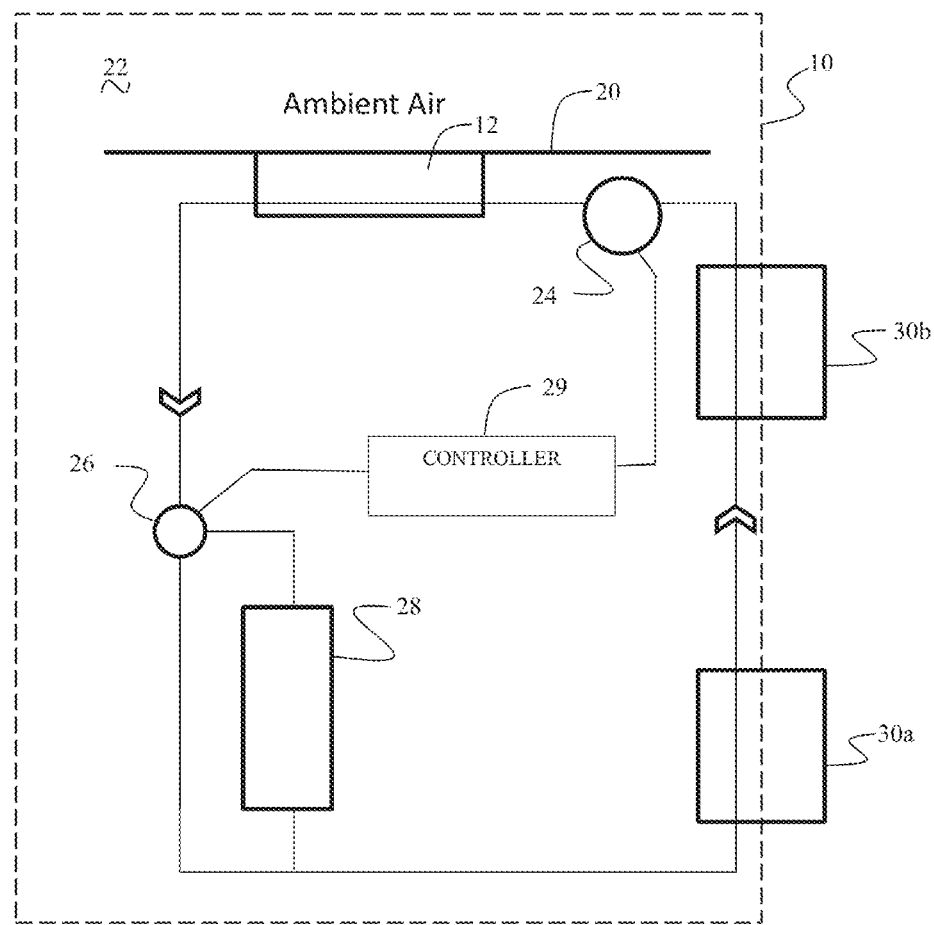
FIG. 2 is a detailed block diagram of the skin heat exchanger system.

As shown in detail in FIG. 2, the closed coolant loop 10 employs the skin heat exchanger 12 in contact with the aircraft skin 20 with the external ambient air 22 convectively cooling the skin. A coolant pump 24, is configured to circulate a non-freezing coolant, such as propylene glycol, as a primary working fluid through the skin heat exchanger 18 for cooling. Primary working fluid exiting the heat exchanger 18 flows through a bypass valve 26 and through an insulated coolant accumulator 28, positioned intermediate the pump and the skin heat exchanger 12, to a freezer-insert-coolant to air heat exchanger 30$a$ and an IGC coolant air heat exchanger 30$b$. The primary working fluid then flows through the pump 24 for circulation back to the skin heat exchanger 12. The insulated coolant accumulator 28 allows for thermal expansion and contraction of the coolant and maintains a reservoir of cold primary working fluid available for use at lower altitudes or in alternative operating scenarios as described in greater detail subsequently. Primary working fluid may be bypassed around the accumulator 20 at the bypass valve 26 sending warmer coolant (as ambient conditions allow) to the freezer insert and IGC coolant air heat exchangers 30$a$, 30$b$ for defrost cycles or other temperature control functions. Operation of the pump 24 and bypass valve 26 may be accomplished with a controller 29 receiving in input from the flight control system of the aircraft for aircraft altitude and inputs from flight crew for special operations as defined below.

Figure 3:
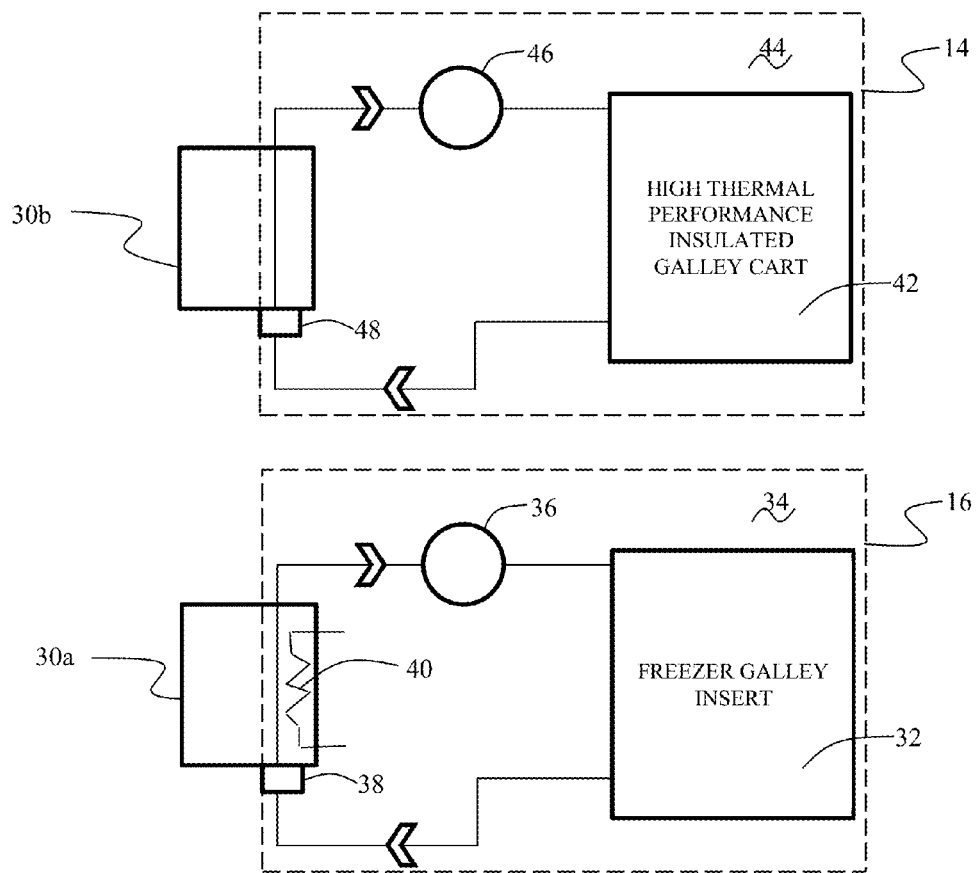
FIG. 3 is a detailed block diagram of the insulated galley cart and freezer inserts system.

As shown in detail in FIG. 3, the semi-closed IGC air loop 14 and semi-closed freezer galley insert air loop 16 are interconnected to the closed coolant loop 10 through the freezer insert and IGC coolant to air heat exchangers 30$a$ and 30$b$. In a particular embodiment, the semi-closed freezer air loop 16 makes use of aircraft cabin air as a circulating secondary working fluid for temperature control of a freezer galley insert 32. The air loop 16 is not a sealed system and air leakage is expected around the freezer galley insert 32 and in a galley hay 34 in which the insert 32 is housed. A blower 36 draws cabin air through the freezer insert coolant to air heat exchanger 30$a$ and delivers cooled air through the freezer galley insert 32. Air exhausted from the freezer galley insert 32 is routed back to the freezer insert coolant to air heat exchanger 30$a$ through a filter 38.

The freezer insert coolant to air heat exchanger 30$a$ operates in a primary mode to provide cooling to the freezer galley insert 32 using the coolant in the closed coolant loop 10 as the heat sink. As a secondary function, placement of the freezer insert coolant to air heat exchanger 30$a$ upstream of the IGC coolant to air heat exchanger 30$b$ allows heating of the coolant in the closed coolant loop 10 to acceptable temperatures for the ICC cooling, as will be described in detail subsequently. Operation with the coolant in the closed coolant loop 10 at a warm condition when the aircraft is not at altitude may be employed to defrost the freezer insert coolant heat exchanger 30$a$ and/or the freezer galley insert 32. A heating element 40 may be employed in the freezer insert coolant to air heat exchanger 30$a$ to achieve desired temperatures for defrosting or otherwise controlling temperatures of the coolant as the primary working fluid or circulated cabin air as the secondary working fluid.

The semi-closed IGC air loop 14 operates similarly with aircraft cabin air as the circulating secondary working fluid for temperature control of a high performance IGC 42. The air loop 14 is not a sealed system and air leakage is expected around the IGC 42 and in a galley bay 44 in which the IGC 42 is housed. A blower 46 draws cabin air through the IGC coolant to air heat exchanger 30$b$ and delivers cooled air through the IGC 42. Air exhausted from the IGC 42 is routed back to the IGC coolant to air heat exchanger 30$b$ through a filter 48.

Figure 4:
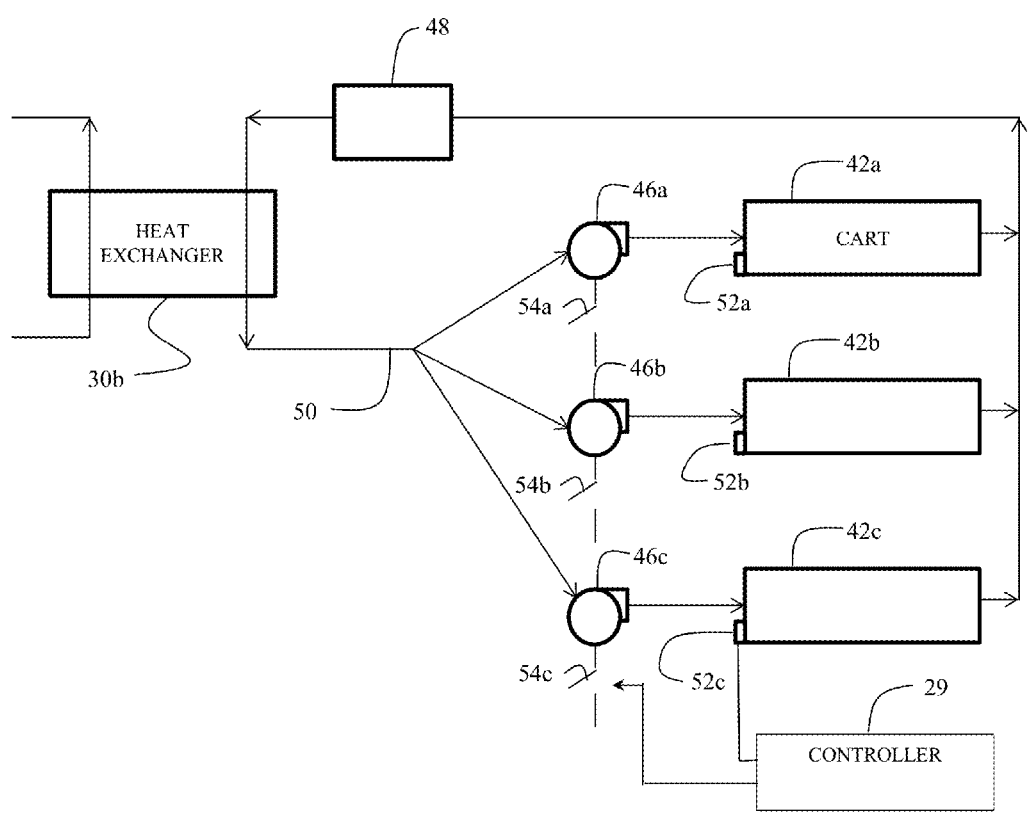
FIG. 4 is a block diagram of a multiple insulated galley cart embodiment.

The cooling capability of the IGC coolant to air heat exchanger 30$b$ in the semi-closed IGC air loop 14 may be employed for multiple IGCs in the galley as shown in FIG. 4, wherein multiple blowers 46$a$, 46$b$ and 46$c$ are connected by a manifold 50 to provide cooling airflow through associated IGCs 42$a$, 42$b$ and 42$c$. Each IGC 42 may be equipped with a proximity sensor 52$s$, 52$b$, 52$c$ providing an output to the controller 29 that, in turn, provides a control input to activate an associated blower 46$a$, 46$b$ or 46$c$ when the associated IGC 42$a$, 42$b$, 42$c$ is placed into a location in the galley bay 44 adjacent the associated blower in that location. Individual connections from the controller 29 to the proximity sensors 52$a$ and 52$b$ and blowers 46$a$ and 46$b$ are not shown in FIG. 4 for simplicity. Alternatively, a blower 46 may be manually activated or deactivated using a power switch or circuit breaker 54$a$, 54$b$, 54$c$ to preclude cold air from issuing from a blower without an IGC interconnected. A similar manifold arrangement with multiple blowers may be employed for the freezer insert coolant to air heat exchanger 30$a$ in the semi-closed freezer galley insert air loop 16.

Figure 5A:
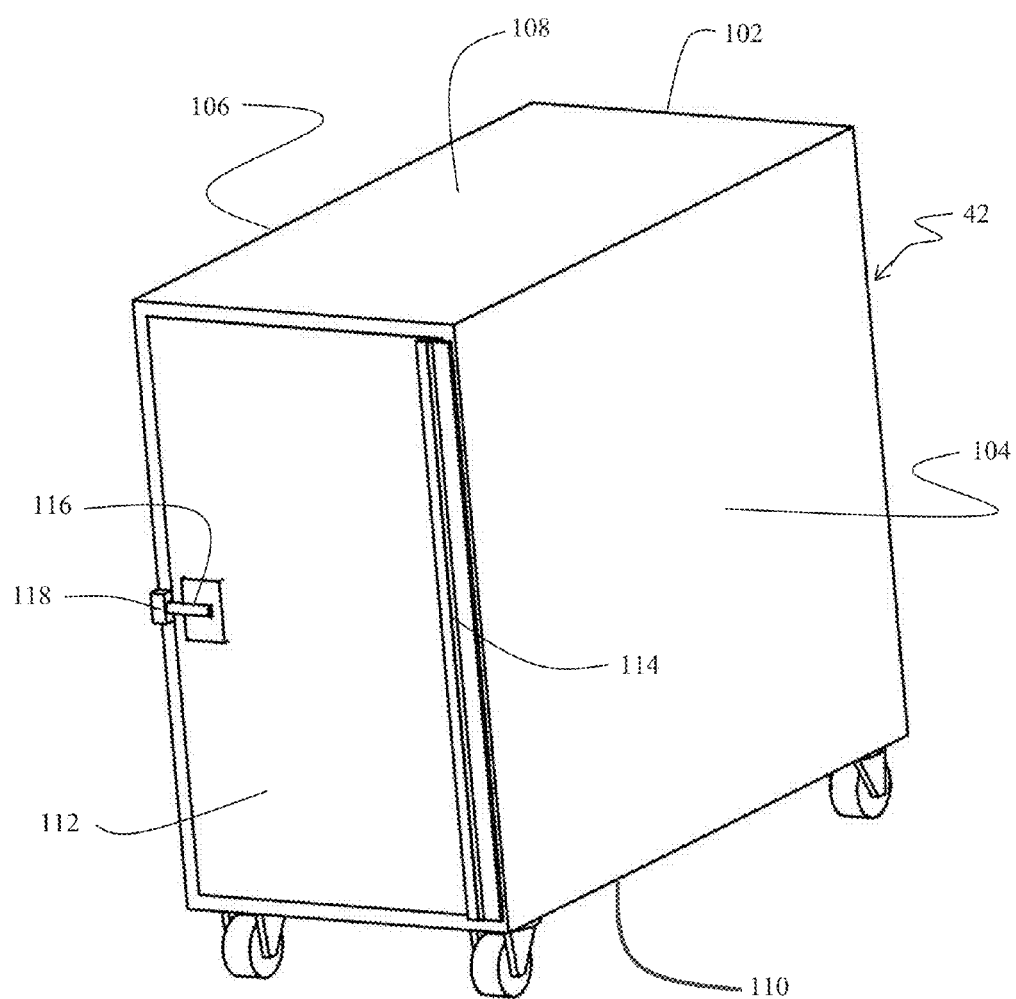
FIG. 5A is a front perspective view of an exemplary insulated galley cart employed for the embodiments herein.
Figure 5B:
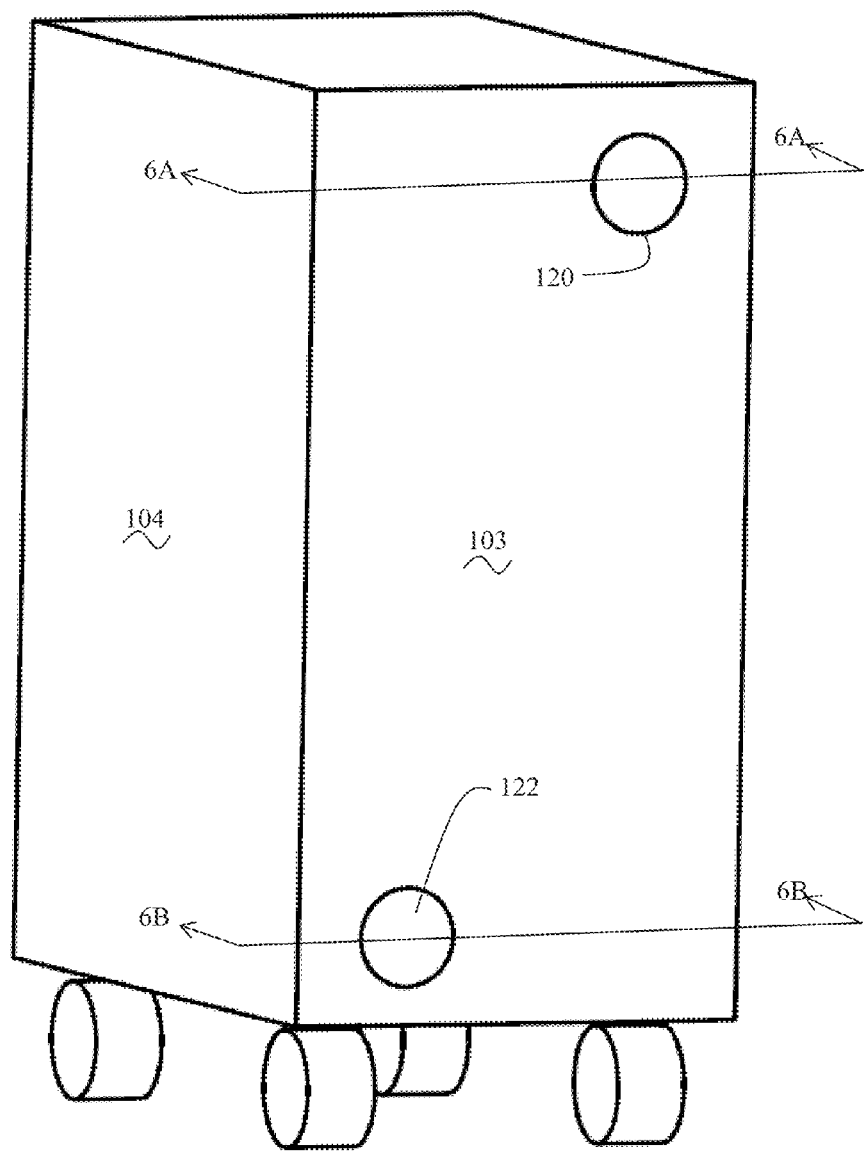
FIG. 5B is a rear perspective view of the insulated galley cart of FIG. 5A.

FIG. 5A is an isometric view of the IGC 42, which may be employed in the embodiments disclosed herein. In one aspect of this embodiment, the IGC 42 includes a housing 102. In the illustrated embodiment, the housing 102 has a first side 104, a second side 106, a top 108, and a bottom 110. The IGC 42 further includes a first door 112 positioned on one end of the housing 102. The door 112 can further include one or more hinges 114 and a latch 116. The hinges 114 pivotally attach the doors 112 to the housing 102. The latch 116 can be configured to releasably engage corresponding receivers 118 attached to the housing 102 when the door 112 is in a closed position as illustrated in FIG. 5A. As shown in FIG. 5B, the IGC 42 employs a inlet port 120 and an outlet port 122 in a rear wall 113 each having flow operated valves as will be describe in greater detail subsequently. Dry ice or water ice compartments may be provided within the IGC 42 for passive cooling of the IGC 42 during transit to and from the aircraft or during use in the aircraft when disengaged from the galley bay 44 (shown in FIG. 3).

Figure 6A:
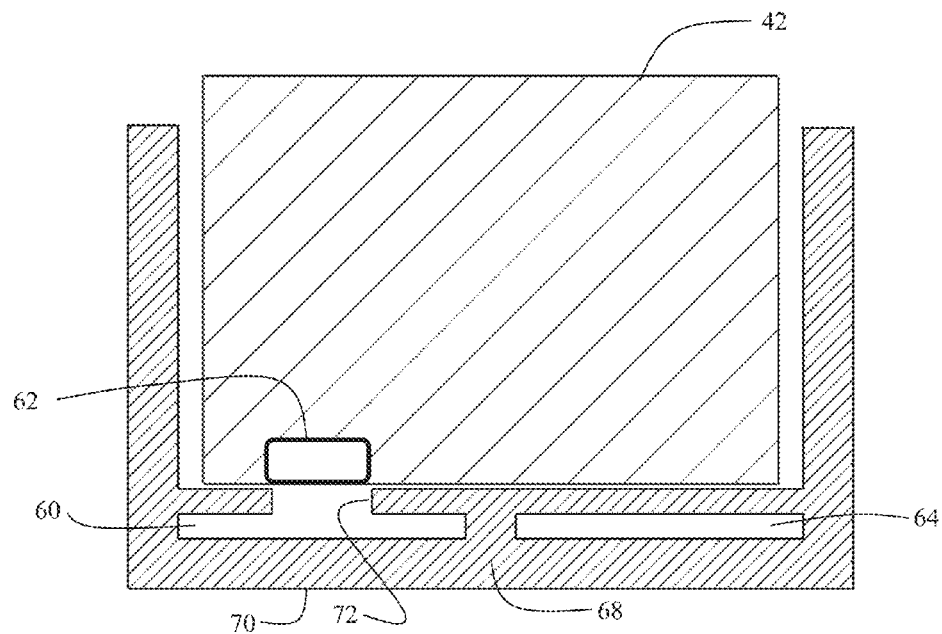
FIG. 6A is a top section view along line 6A-6A in FIG. 5B of the insulated galley cart as docked in a galley showing the supply duct engagement.
Figure 6B:
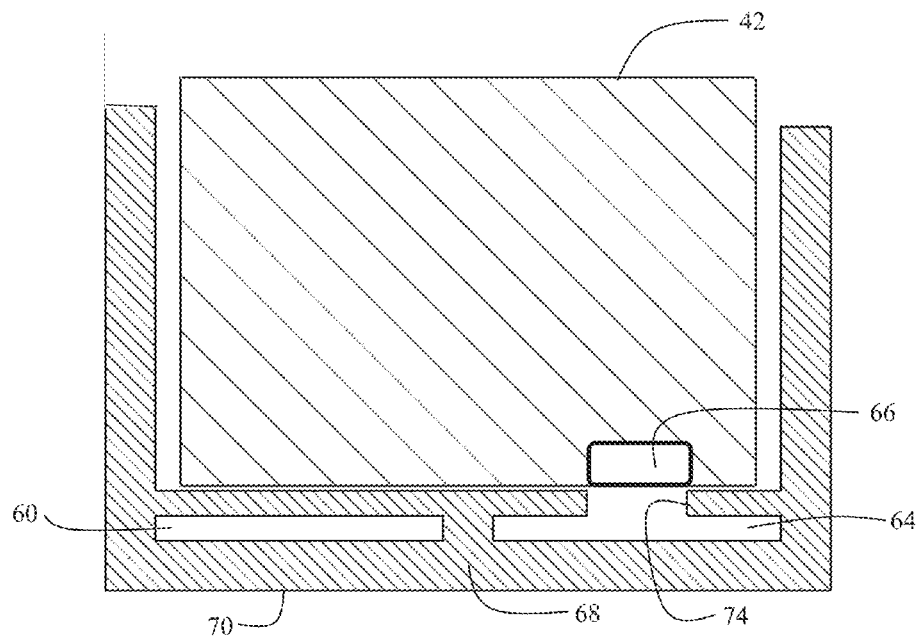
FIG. 6B is a top section view along line 6B-6B of FIG. 5B of the insulated galley cart as docked in a galley showing the exhaust duct engagement.

Employing an architecture for cabin air as the secondary working fluid, which is not required to be completely sealed, provides a simplification in the overall structure of the galley and IGCs. As shown in FIGS. 6A and 6B, a supply duct 60, into which the blower 46 provides airflow, introduces cold air to the IGC 42 through an inlet valve 62. An exhaust duct 64 allows air to be exhausted from the IGC 42 through an exhaust valve 66. A simple supply opening 72 of, for example, approximately 2 inch (5.1 cm) diameter and an exhaust opening 74 of comparable size allow flow out of the supply duct 60 and into the exhaust duct 64 without using valves or dampers. The supply duct 60 and exhaust duct 64 may be constructed by interconnecting multiple panels or by removing core material 68 from a composite panel 70 to create voids for the channels with simple holes for the supply and exhaust openings. With the associated blower turned off, essentially no flow is present in the supply duct or exhaust duct.

Figure 7A:
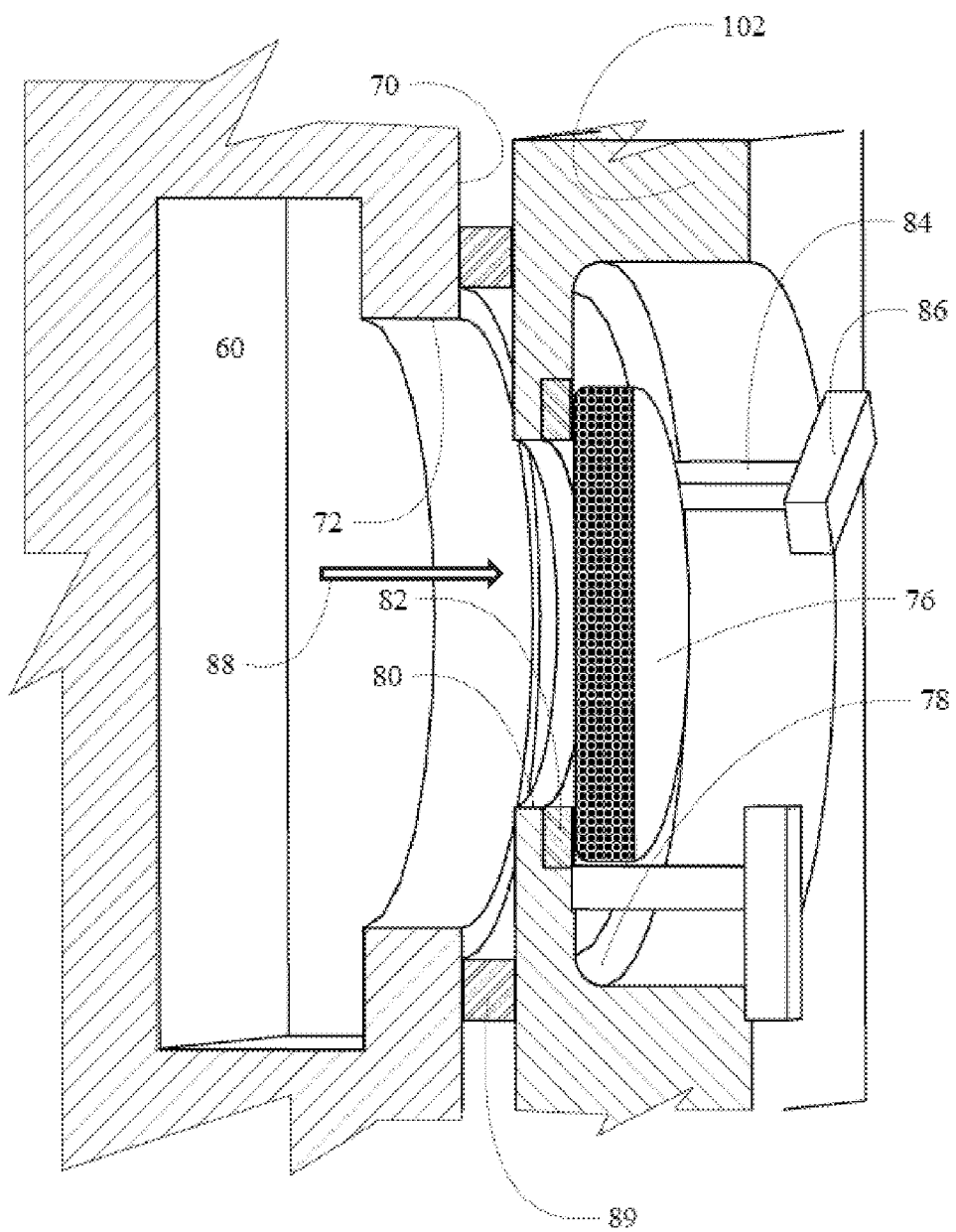
FIG. 7A is a perspective side section view of the magnetic inlet valve in a closed condition.
Figure 7B:
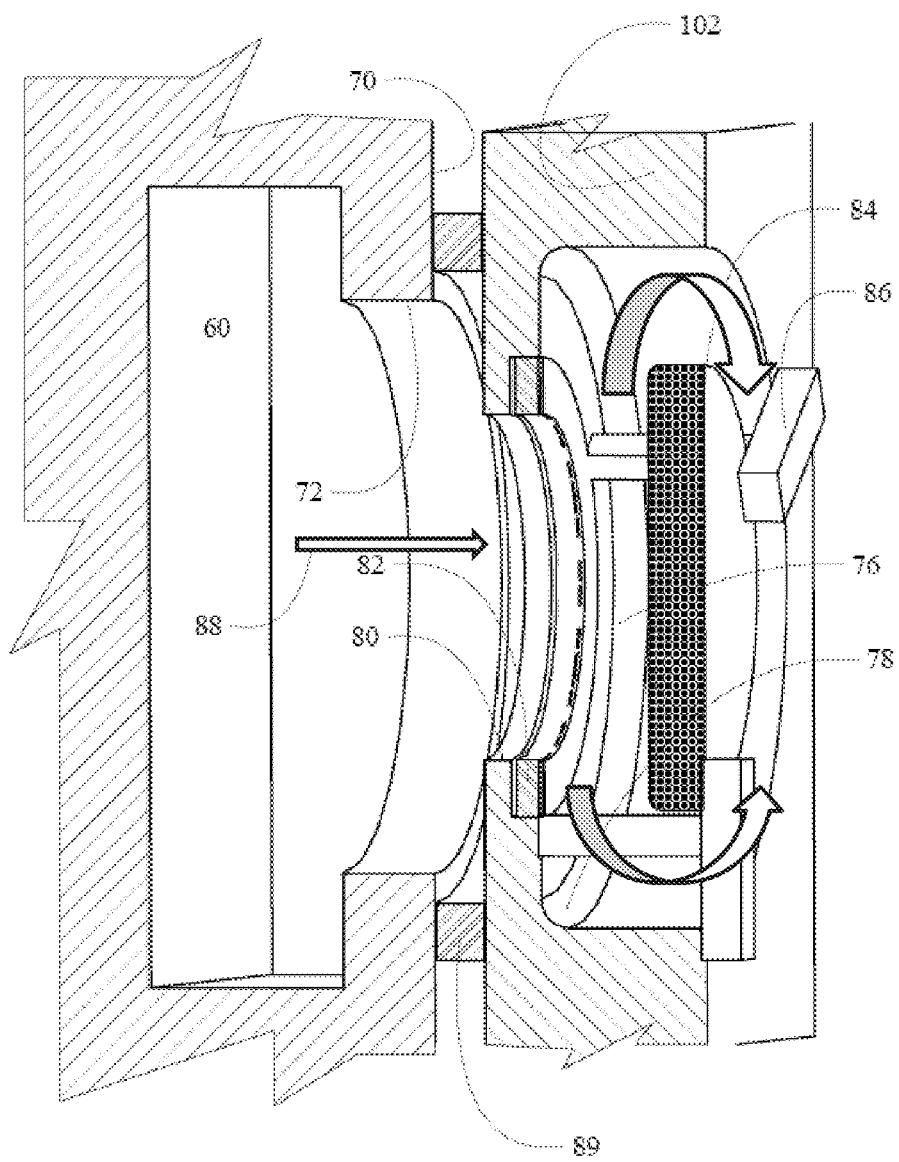
FIG. 7B is a perspective side section view of the magnetic inlet valve in an open condition.
Figure 7C:
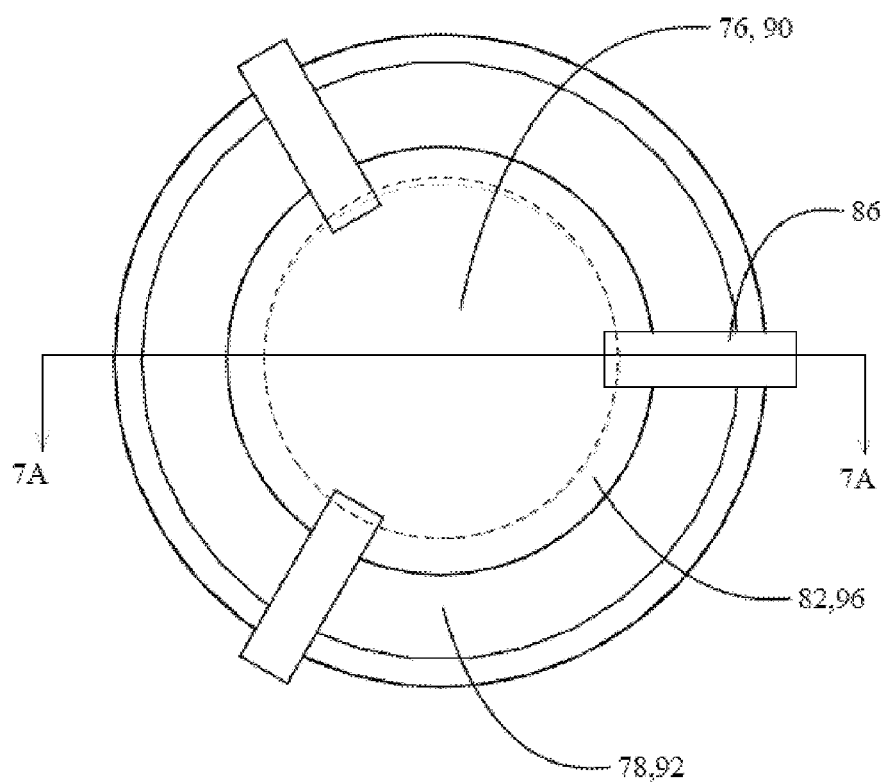
FIG. 7C is a front view of the magnetic inlet valve from inside the insulated galley cart.

The inlet valve 62 and exhaust valve 66 provide automatic actuation for opening when engaged to the supply duct 60 and exhaust duct 64 in the galley and for closing when disengaged. The valves 62, 66 may be simple flow actuated valves devices opened by flow pressure created by the blower 46. As shown in FIG. 7A, an inlet valve plate 76 is received in a relief 78 in the rear wall 113 of the IGC 42. The valve plate 76 covers an inlet aperture 80. In a particular embodiment, the inlet valve plate 76 is a magnetic material and is attracted to a magnetic element 82 positioned circumferentially around the inlet aperture 80. Guide rails 84 terminating in retention clips 86 allow reciprocation of the valve plate 76 to an open position as shown in FIG. 7B when activation of the blower 46 creates airflow in the inlet duct 60 and through supply opening 72 as represented by arrow 88. A compliant seal 89 may be employed between the rear wall 113 of the IGC 42 and the galley wall composite 70 to create at least a partial seal around the inlet aperture 80. For an exemplary embodiment, three guide rails with retention clips are employed for the inlet valve 62 as shown in FIG. 7C.

Figure 7D:
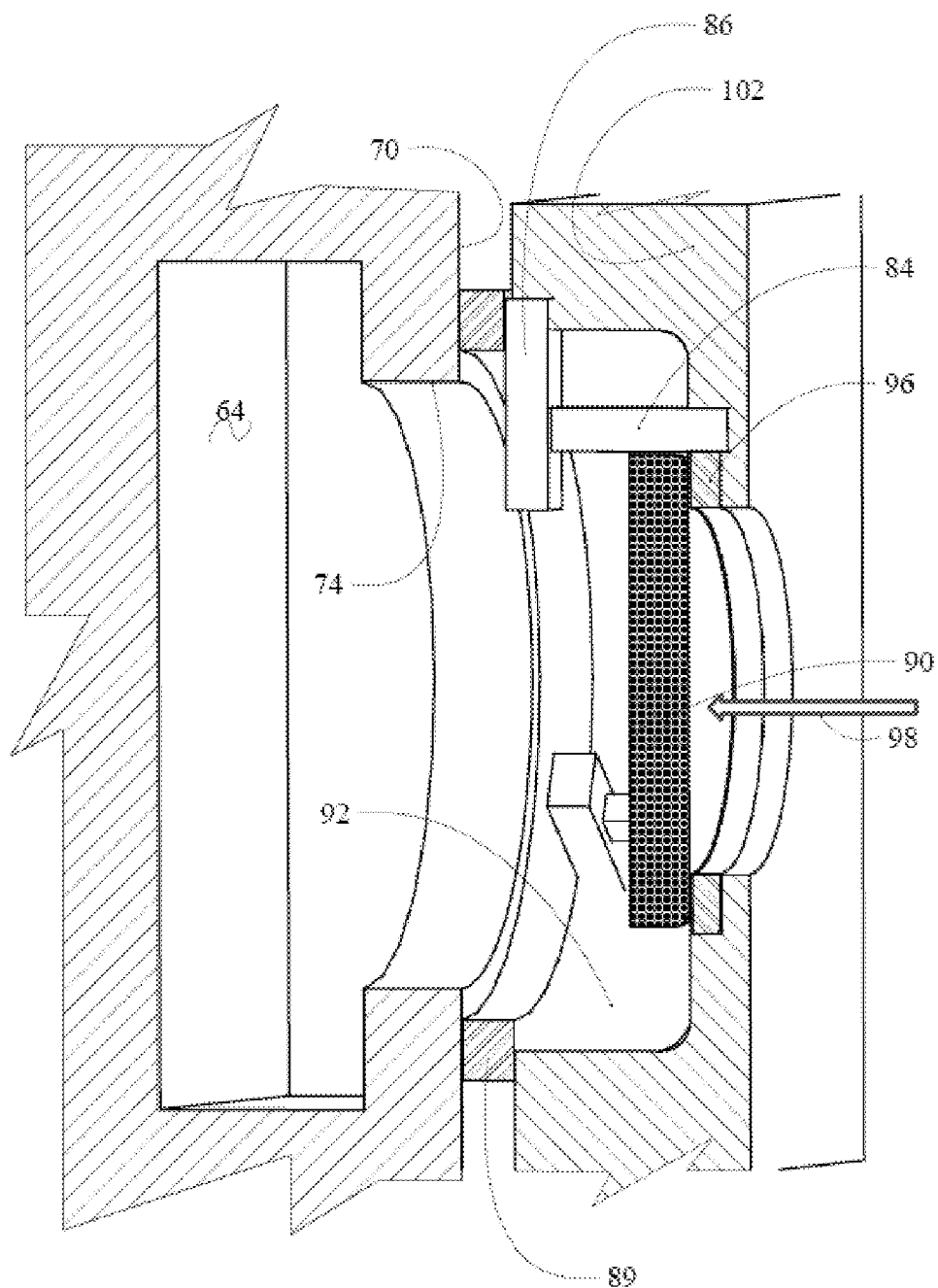
FIG. 7D is a perspective side section view of the magnetic exhaust valve in a closed condition.
Figure 7E:
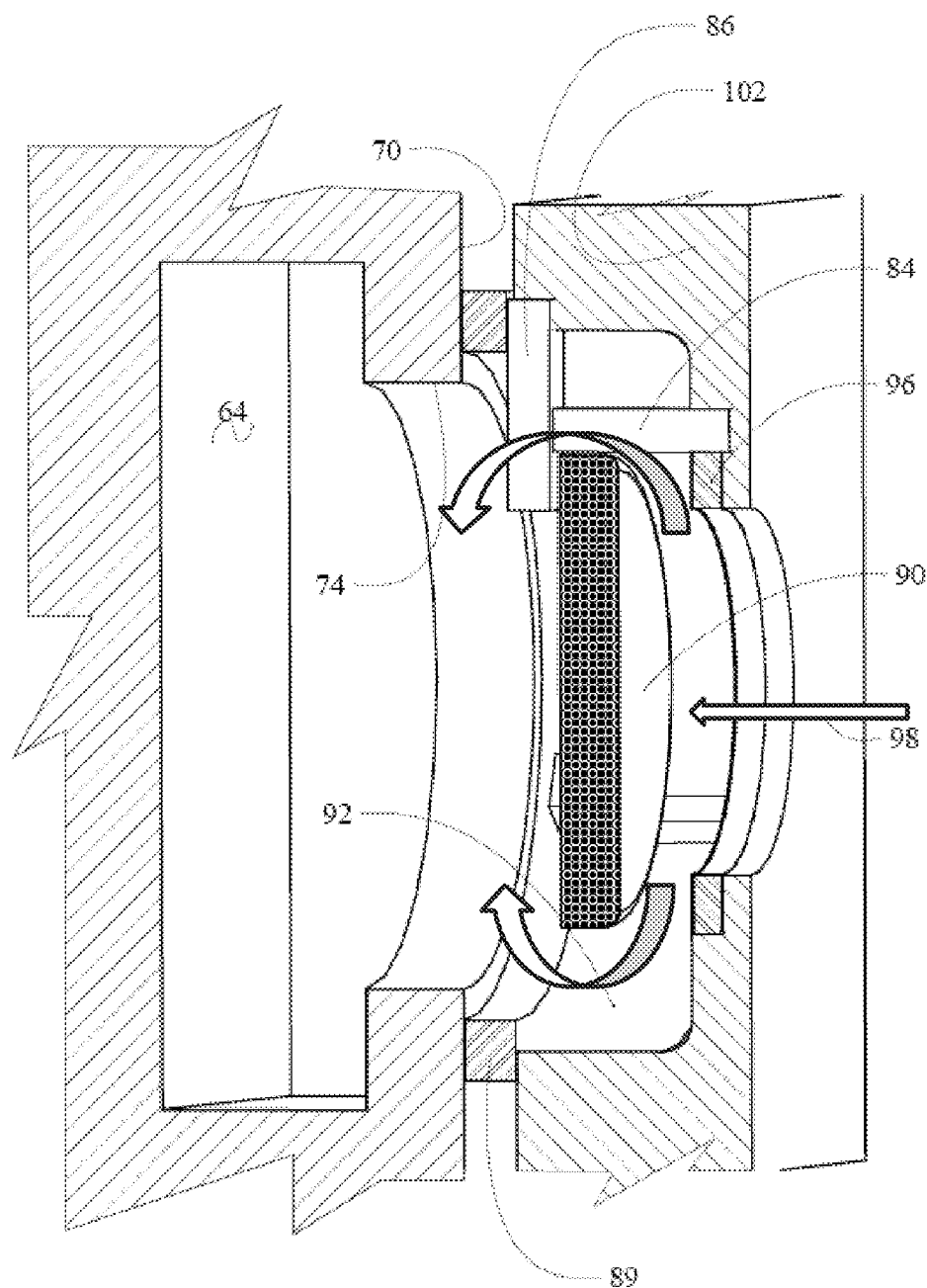
FIG. 7E is a perspective side section view of the magnetic exhaust valve in an open condition.

Air pressure in the IGC 42 created by the inflow of air through the inlet valve 62 operates on the exhaust valve 66 as shown in FIGS. 7D and 7E. An exhaust valve plate 90 is received in a relief 92 in the rear wall 113 of the IGC 42. The valve plate covers an exhaust aperture 94 in the closed position as shown in FIG. 7D. In a particular embodiment, the exhaust valve plate 90 is a magnetic material and is attracted to a magnetic element 96 positioned circumferentially around the exhaust aperture 94. Guide rails 84 terminating in retention clips 86 allow reciprocation of the exhaust valve plate 90 to an open position as shown in FIG. 7E when activation of the blower 46 creates airflow in the inlet duct 60 and through supply opening 72 resulting in internal pressure in the IGC as represented by arrow 98. For an exemplary embodiment, three guide rails with retention clips are employed for the exhaust valve 66 as shown in FIG. 7C. As with the inlet valve, a compliant seal 89 may be employed around the exhaust aperture 94 to provide at least a partial seal around the opening.

Figure 7F:
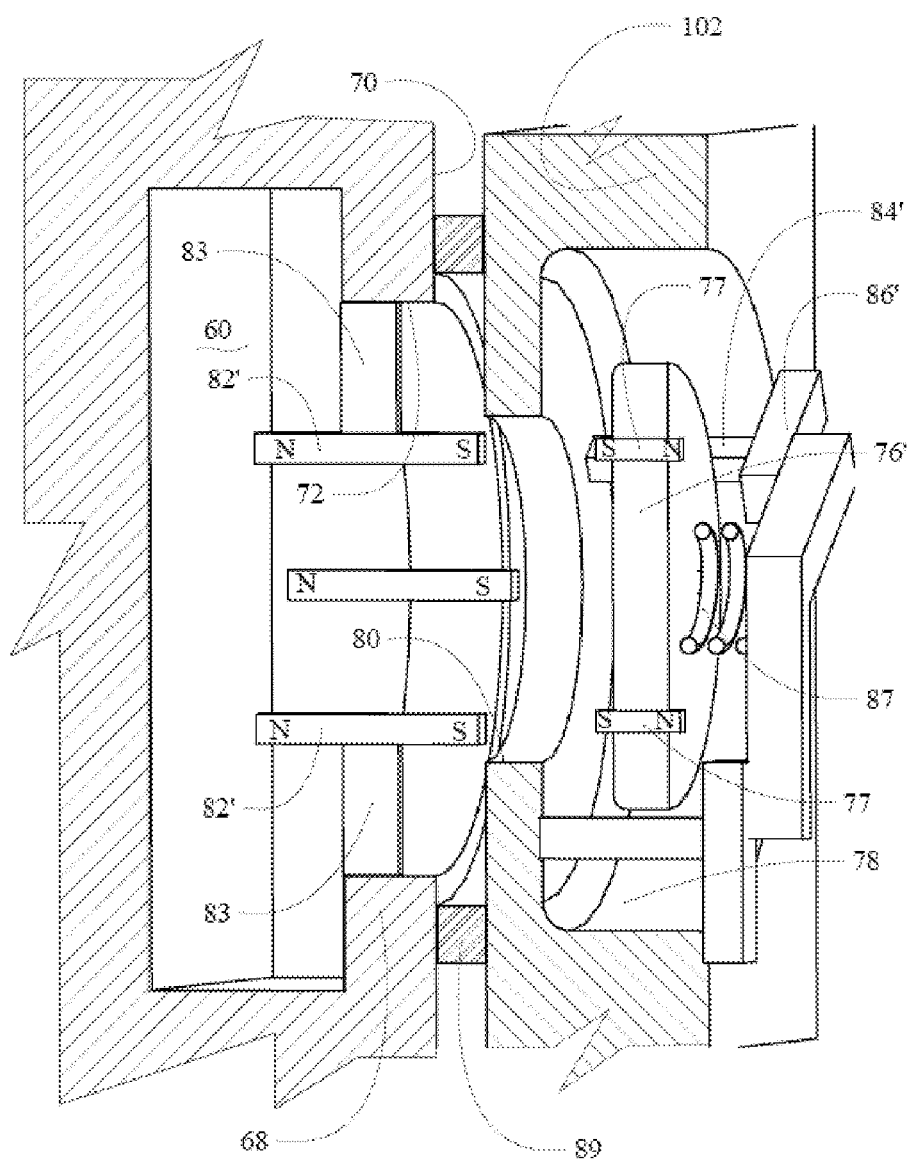
FIG. 7F is a perspective side section view of an alternative inlet valve in an open condition.
Figure 7G:
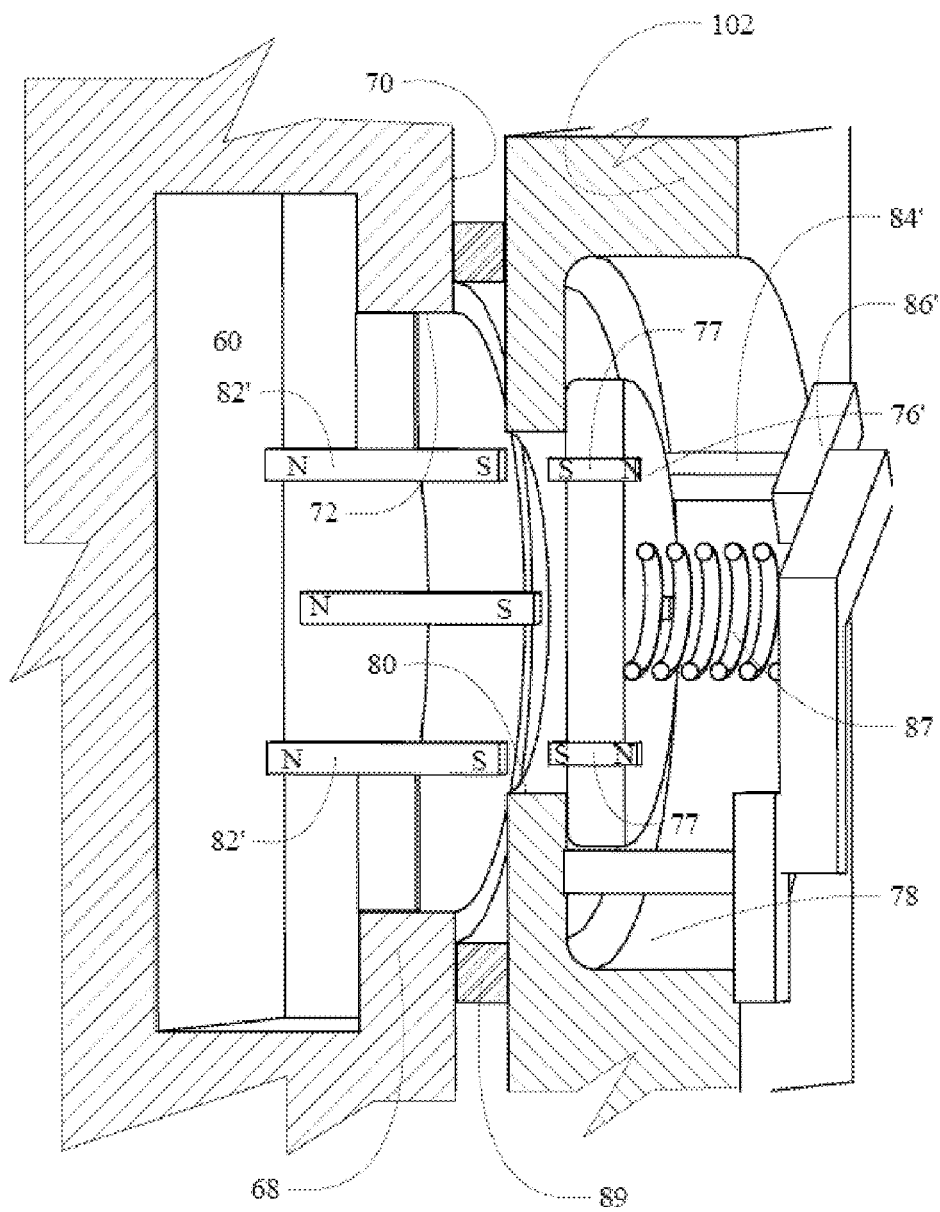
FIG. 7G is a perspective side section view of the alternative inlet valve of FIG. 7F in a closed condition; and, FIGS. 8A and 8B are a flowchart demonstrating the operation of the embodiments disclosed herein.

Alternative valve structures providing automatic opening and closing when engaged to the supply duct 60 or exhaust duct 64, or upon activation of the blower 46 may be employed. An alternative valve arrangement is shown in FIGS. 7F and 7G wherein the inlet valve plate 76' incorporates one or more magnets 77. The magnetic element 82 of the valve structure of FIGS. 7A-7C is removed and replaced with magnetic elements 82' embedded in the core material 68 surrounding the supply opening 72 or suspended in the supply opening 72 by struts 83. Polarity of the magnetic elements 82' and the magnets 77 in the valve plate 76' are opposite to provide a repulsion force urging the valve plate 76' open upon engaging the IGC 42 against the supply opening 72 as shown in FIG. 7F. Guide rails 84' and retention clips 86' constrain the motion of the valve plate 76' as in the prior embodiment. Upon removal of the IGC 42 from the galley, a spring 87 urges the valve plate 76' into a closed position as shown in FIG. 7G. For an exhaust valve, a reversal of the orientation of the valve plate 76' and associated guide rails, retention clips and spring may be employed with the polarity of the magnetic elements 82' surrounding the exhaust opening 74 and the magnets 77 in the valve plate 76' aligned for attraction to urge the valve plate 76' open.

Figure 8A:
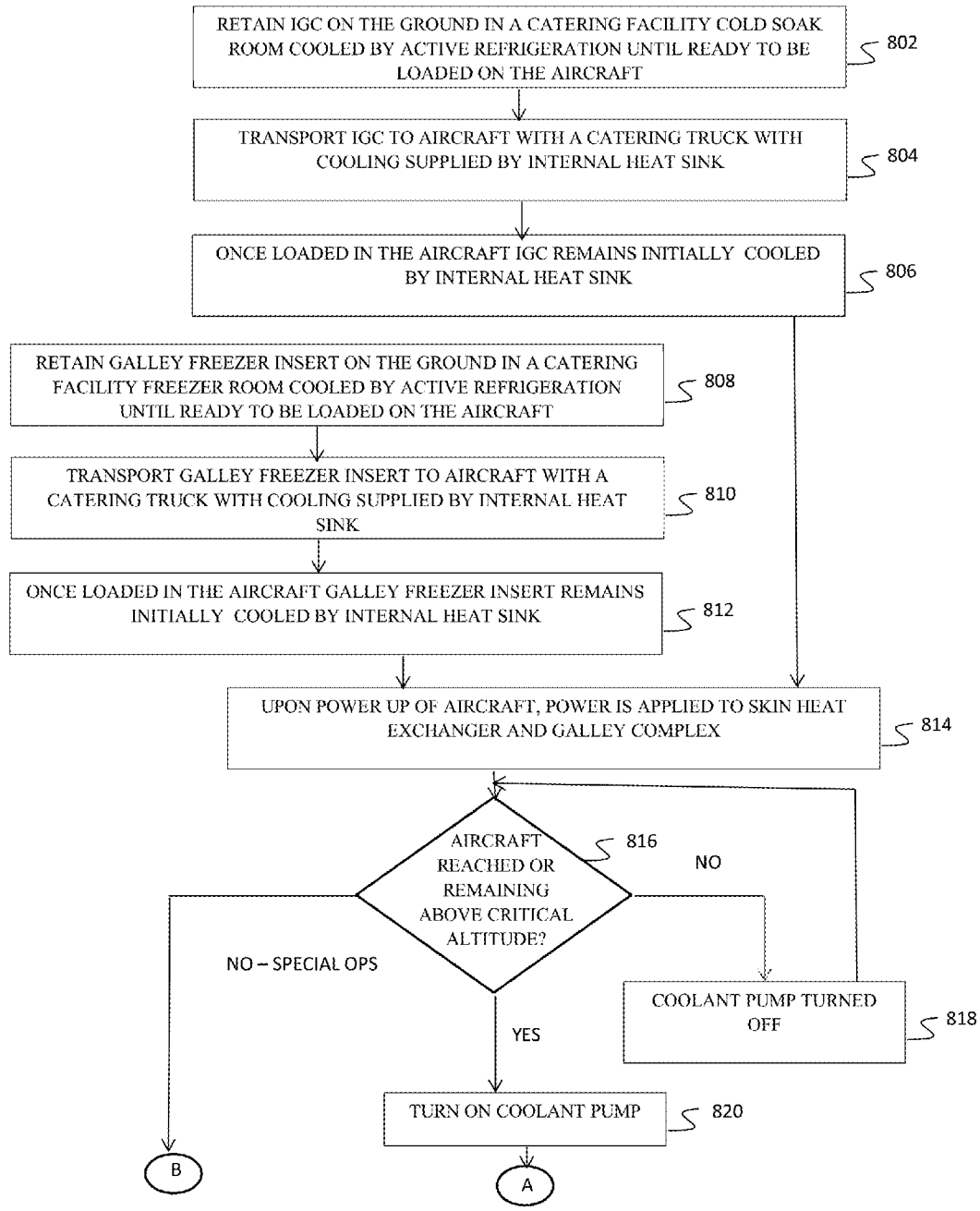
Figure 8B:
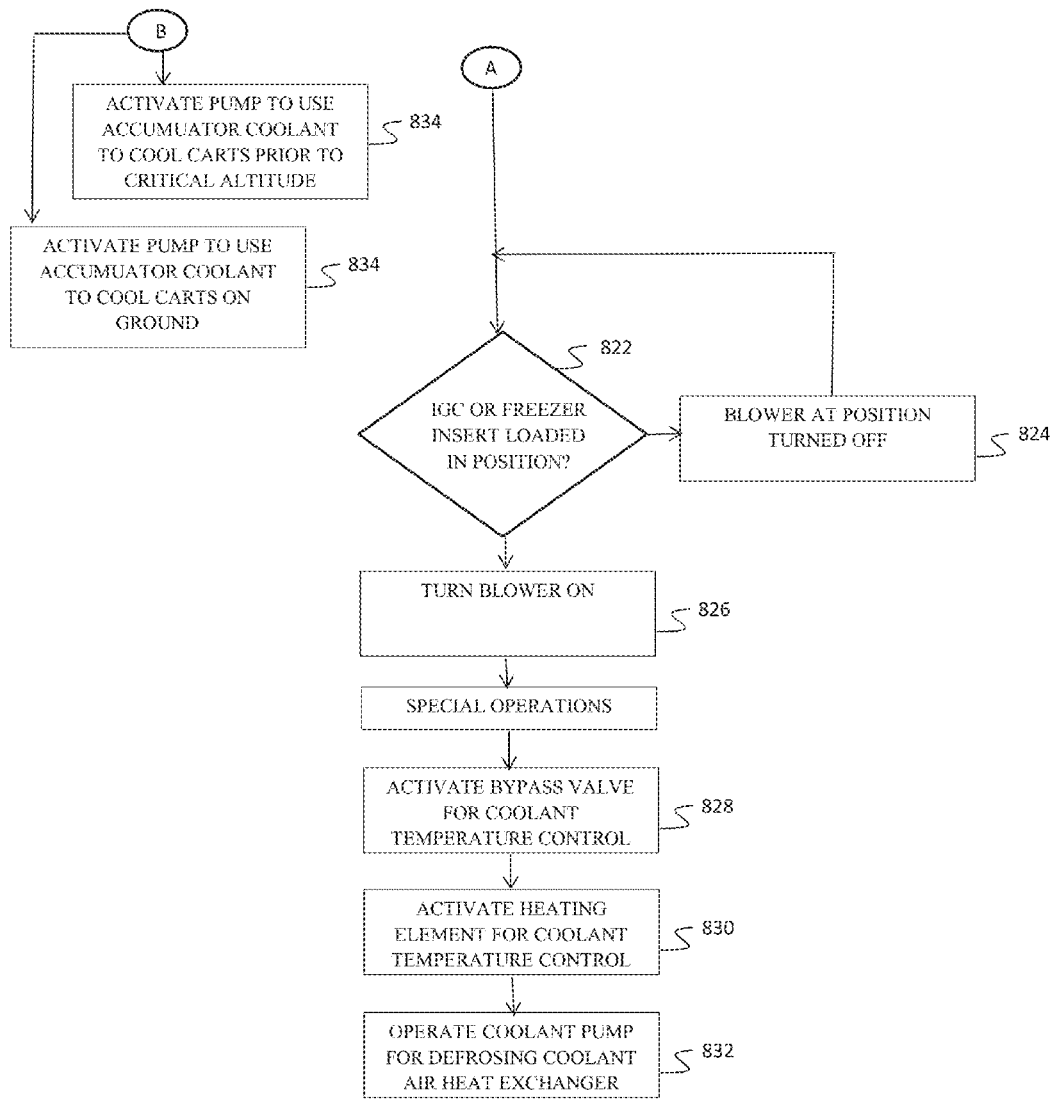

The embodiments disclosed provide a simplified cooling system for galley supply components such as IGCs and freezer galley inserts and their operation. As shown in FIGS. 8A and 8B, an IGC, such as IGC 42, may be retained on the ground in a catering facility cold soak room that is cooled by active refrigeration until ready to be loaded on the aircraft, step 802. A catering truck may then be employed to transport the IGC to the aircraft with cooling in the IGC supplied by an internal heat sink, such as dry ice or water ice, step 804, with or without supplemental active refrigeration in the truck. Once loaded in the aircraft, during on-ground or climb-out operations, except as described subsequently, the IGC remains initially cooled by the internal heat sink, step 806.

Similarly, if freezer galley inserts, such as insert 32, are employed, the freezer galley insert is cooled by active refrigeration in a catering facility freezer room until ready to be loaded on the aircraft, step 808. A catering truck may then be employed to transport the freezer galley insert to the aircraft with cooling in the freezer galley insert supplied by an internal heat sink, such as dry ice, step 810, with or without supplemental active refrigeration in the truck. Once loaded in the aircraft, during on-ground or climb-out operations, the freezer galley insert remains cooled by the internal heat sink, step 812.

Upon powering up of the aircraft, power is applied to the skin heat exchanger and galley bay, step 814. Aircraft status is monitored with a system controller to determine if the aircraft has reached or remains above a critical altitude to provide external temperatures sufficient for cooling in the skin heat exchanger closed coolant loop, step 816. As such, the system controller determines if the aircraft is at least at the critical altitude. If the aircraft is not at or above the critical altitude, the coolant pump, such as pump 24, is deactivated, step 818. If the critical altitude has been reached, the coolant pump is activated, step 820. Each blower location in the semi-closed freezer galley insert air loop and semi-closed IGC air loop is then monitored to determine if an IGC or freezer galley insert is loaded into position at that location, step 822. If not, the blower at that IGC or freezer galley insert position is turned off, step 824.

If an IGC or freezer galley insert is loaded in or returned to the blower location, the blower at that position is turned on, step 826. In special operations as determined by the system controller, for temperature control a bypass valve may be activated to bypass a coolant accumulator, step 828. A heating element in a coolant to air heat exchanger in the semi-closed freezer galley insert air loop may be activated to further control coolant temperature, step 830. With appropriate environmental conditions when the aircraft is below the critical altitude, the coolant pump may be operated to defrost the coolant air heat exchanger in the semi-closed air loop, step 832. In alternative operating scenarios, stored coolant in the accumulator may also be used to cool carts during the climb out or descent by selectively turning on the coolant pump, step 834, when the aircraft has not reached or does not remain above the critical altitude. Also during thru-catered situations (the round-trip flight is catered from one location and the food for both the outbound and return flight are loaded at once), stored coolant in the accumulator may be used to cool carts while on the ground, step 836.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A system for cooling a thermally insulated galley cart in an aircraft, the system comprising:
    a skin heat exchanger configured to transfer heat to a skin of an aircraft;
    a cooling system in communication with the skin heat exchanger, said cooling system incorporating
    a closed coolant loop employing a non-freezing coolant flowing through the skin heat exchanger;
    a plurality of coolant to air heat exchangers; and,
    a plurality of semi-closed air loops, each semi-closed air loop connected to one of said plurality of coolant to air heat exchangers, each semi-closed air loop removably coupled with a thermally insulated galley cart (IGC), each semi-closed air loop separately operable upon coupling of a IGC, each semi-closed air loop further comprising:
        a plurality of blowers configured to draw cabin air through the plurality of coolant to air heat exchanger and to deliver cooled air to the IGC each blower separately operable upon coupling of the IGC; and,
        a filter configured to receive air exhausted from the IGC for delivery through the plurality of coolant air heat exchangers;
    a supply duct having a supply opening removably contacted by an inlet IGC with an associated one of the plurality of semi-closed air loops to deliver cooled air from the supply duct to the IGC; and,
    an exhaust valve in the IGC that removably contacts an exhaust opening in an exhaust duct, the exhaust valve automatically operable to open upon engagement of the IGC with the associated one semi-closed air loop to exhaust the cooled air from the IGC.

2. The system as defined in claim 1 wherein the closed coolant loop further comprises:
    a coolant pump configured to circulate coolant through the skin heat exchanger and the at least one coolant air heat exchanger;
    an insulated coolant accumulator positioned intermediate the coolant pump and the at least one coolant air heat exchanger;
    an accumulator bypass valve configured to receive coolant from the coolant pump and to bypass flow around the insulated coolant accumulator.

3. The system as defined in claim 1 wherein the supply duct and the exhaust duct are formed in a galley panel.

4. The system as defined in claim 3 wherein the supply duct and the exhaust duct are formed by removing core material from a composite galley panel.

5. The system as defined in claim 1 wherein the inlet valve and the outlet valve each comprise:
    a disk of magnetic material received in a relief in a rear wall of the IGC and configured to seal an inlet aperture in the rear wall in a closed position;
    a plurality of rails supporting the disk for reciprocating action with retention clips terminating the rails to constrain the disk in an open position; and,
    a magnetic element configured to urge the disk into the closed position, magnetic attraction between the magnetic element and the disk overcome by air pressure from the at least one blower.

6. The system as defined in claim 1 further comprising a proximity detector associated with the IGC operable to determine a presence of a docked IGC at an associated blower, said blower activated in response to an output of the proximity detector.

7. A system for cooling a thermally insulated galley cart in an aircraft, the system comprising:
    a skin heat exchanger configured to transfer heat to an aircraft skin;
    a cooling system in communication with the skin heat exchanger, said cooling system incorporating
    a closed coolant loop employing a non-freezing coolant flowing through the skin heat exchanger;
    at least one coolant to air heat exchanger; and,
    a plurality of semi-closed air loops connected to the at least one coolant to air heat exchanger, each semi-closed air loop removably coupled with a thermally insulated galley cart (IGC)
    wherein the plurality of semi-closed air loops comprises a first semi-closed air loop configured to receive a freezer galley insert and at least one second semi-closed air loop configured to receive the IGC.

8. The system as defined in claim 7 wherein the first semi-closed air loop employs a first coolant air heat exchanger and the at least one second semi-closed air loop employs a second coolant air heat exchanger, said first coolant air heat exchanger positioned upstream of said second coolant air heat exchanger and configured to heat the coolant prior to the coolant entering the second coolant air heat exchanger.

9. The system as defined in claim 8 further comprising a heating element in the first coolant air heat exchanger.

10. A method for maintaining temperature control of foodstuffs for use in an aircraft, said method comprising:
    cooling a thermally insulated galley cart (ICG) with an internal heat sink during on-ground or climb-out operations of an aircraft;
    monitoring aircraft altitude to determine if the aircraft is at least at a critical altitude to provide external temperatures sufficient for cooling in a closed coolant loop in communication with a skin heat exchanger configured to transfer heat to a skin of the aircraft, said closed coolant loop employing a non-freezing coolant flowing through the skin beat exchanger;
    when critical altitude has been reached, turning on a coolant pump;

monitoring blower locations in a plurality of the semi-closed air loops, each semi-closed air loop connected to one of a plurality of coolant to air heat exchangers, each semi-closed air loop configured to be removably coupled with the IGC, each semi-closed air loop separately openable upon coupling of the IGC, each semi-closed air loop further comprising:
- a plurality of blowers configured to draw cabin air through the plurality of coolant to air heat exchanger and to deliver cooled air to the IGC each blower separately operable upon coupling of the IGC; and,
- a filter configured to receive air exhausted from the IGC for delivery through the plurality of coolant air heat exchangers;

a supply duct having a supply opening removably contacted by an inlet valve in the IGC, the inlet valve automatically operable to open upon engagement of the IGC with an associated one of the plurality of semi-closed air loops to deliver cooled air from the supply duct to the IGC; and, an exhaust valve in the IGC that removably contacts an exhaust opening in an exhaust duct, the exhaust valve automatically operable to open upon engagement of the IGC with the associated one semi-closed air loop to exhaust the cooled air from the IGC to determine if the IGC is loaded into position at a particular location of one of the plurality of blowers; and when an IGC is positioned in the particular location, said one of the plurality of blower is activated.

11. The method as defined in claim 10 further comprising cooling the IGC with the internal heat sink prior to loading the IGC on the aircraft.

12. The method as defined in claim 10 further comprising controlling coolant temperature by activating a bypass valve to bypass a coolant accumulator.

13. The method as defined in claim 10 further comprising controlling coolant temperature by activating a heating element in the coolant air heat exchanger.

14. The method as defined in claim 10 further comprising defrosting the coolant air heat exchanger by operating of the coolant pump when the aircraft is below the critical altitude.

15. The method as defined in claim 10 further comprising selectively activating the coolant pump to use coolant stored in a coolant accumulator to cool the IGC prior to the aircraft being at least at the critical altitude.

* * * * *